May 11, 1965 T. B. DALTON 3,182,957
LANDING GEAR FOR SEMI-TRAILER VEHICLES AND THE LIKE
Filed May 28, 1962 4 Sheets-Sheet 1

INVENTOR.
THOMAS B. DALTON
BY
Barnes, Kisselle, Raisch & Choate
ATTORNEYS

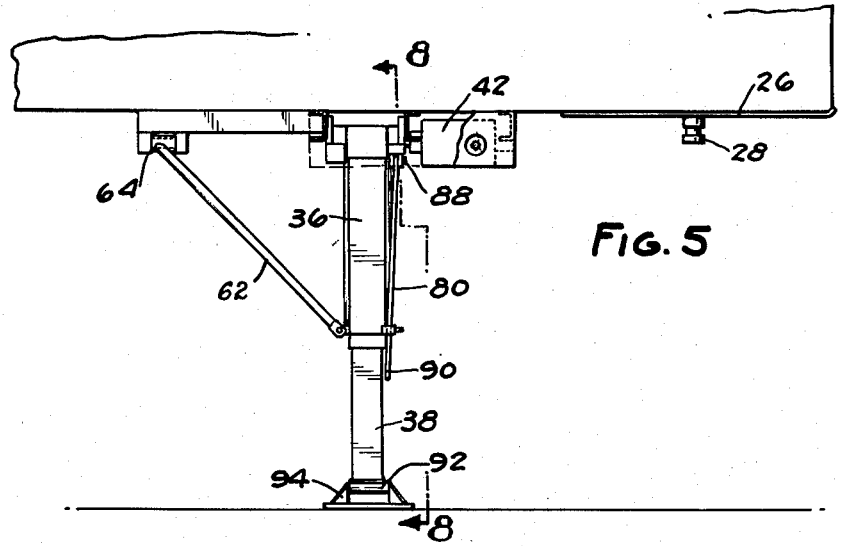
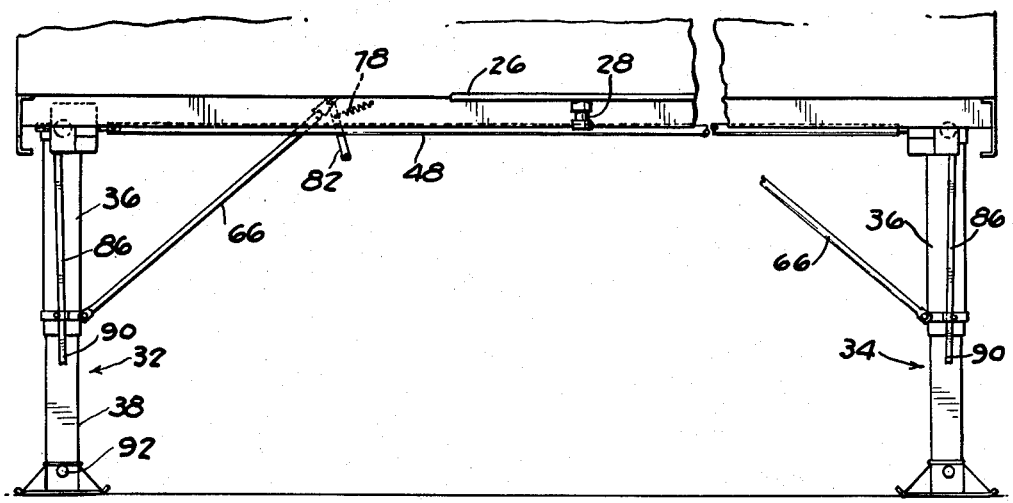
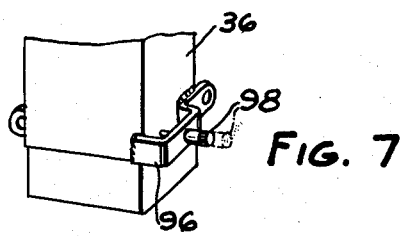

May 11, 1965  T. B. DALTON  3,182,957
LANDING GEAR FOR SEMI-TRAILER VEHICLES AND THE LIKE
Filed May 28, 1962  4 Sheets-Sheet 3
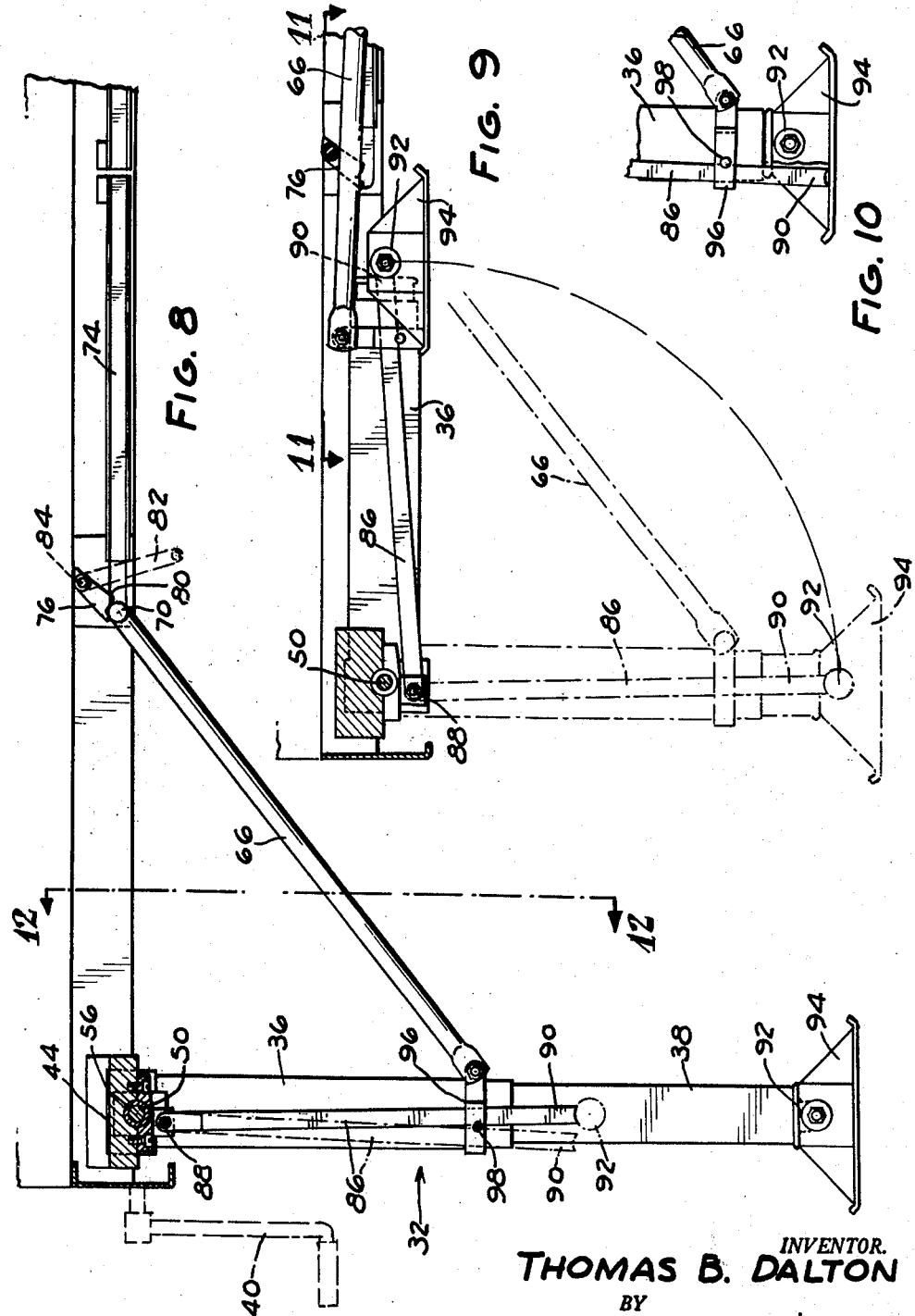
INVENTOR.
THOMAS B. DALTON
BY
Barnes, Kisselle, Raisch & Choate
ATTORNEYS

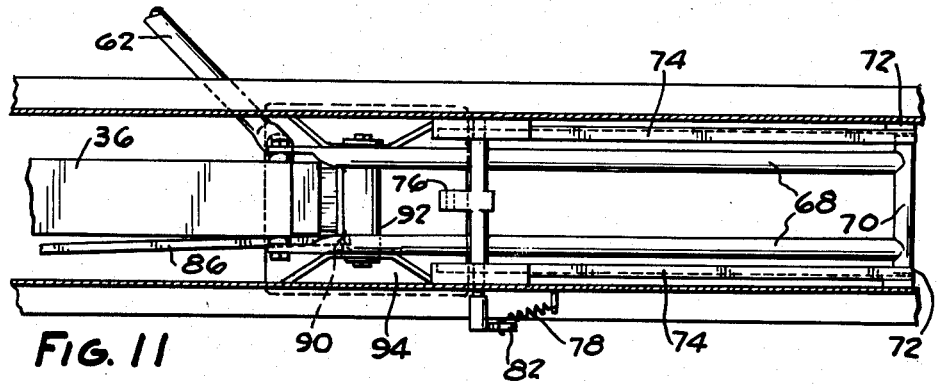
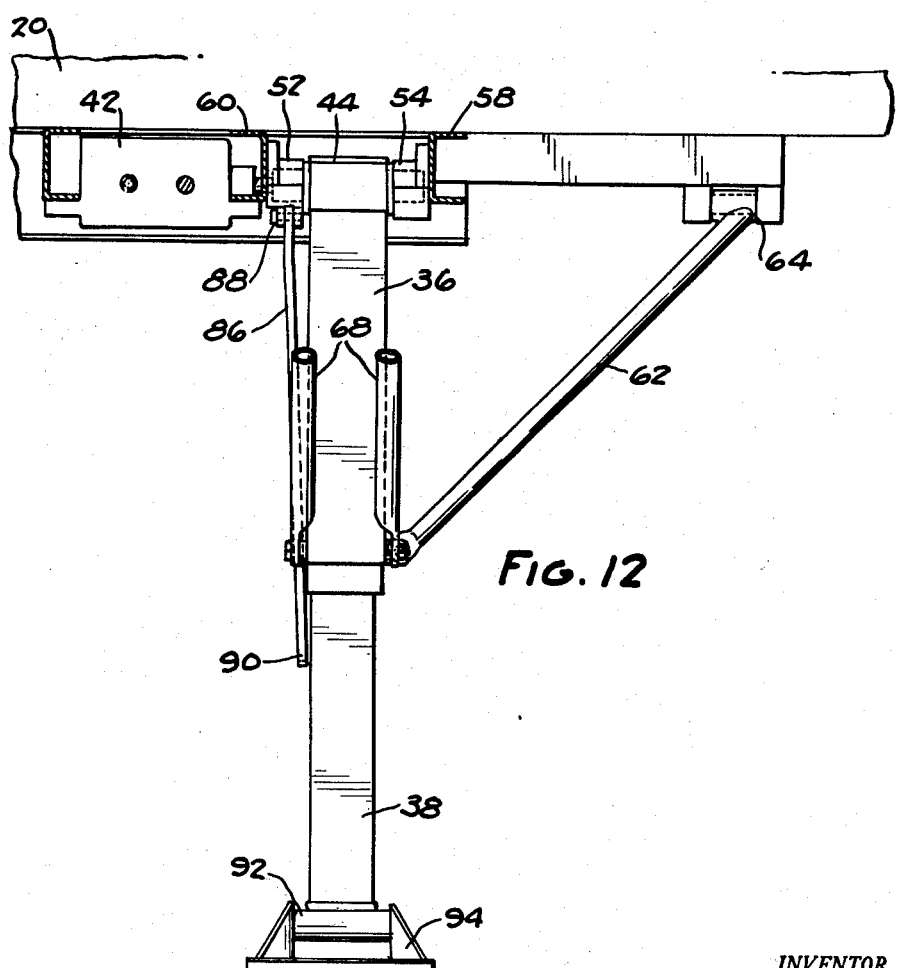

United States Patent Office 3,182,957
Patented May 11, 1965

3,182,957
LANDING GEAR FOR SEMI-TRAILER
VEHICLES AND THE LIKE
Thomas B. Dalton, Muskegon, Mich., assignor to Westran
Corporation, Muskegon, Mich., a corporation of
Michigan
Filed May 28, 1962, Ser. No. 198,020
6 Claims. (Cl. 254—86)

This invention relates to landing gear of the type used to support the forward end of a semi-trailer when it is uncoupled from a tractor. More particularly, the invention involves landing gear of the type whose legs retract by telescoping from an extended load-bearing condition to a shortened condition, and swinging upwardly to a folded position. The legs return to load-bearing position by swinging downwardly and telescoping to extended condition.

The object of this invention is to provide a landing gear leg having an improved actuating structure which is simpler, less costly, and lighter weight than prior structures of this nature.

The invention generally contemplates the use of a strut which is pivoted onto a support adjacent the leg and which detachably connects with the lower leg section when the latter is telescoped to partially shortened condition. The strut is angled to the leg axis so that when the leg is further shortened a lever arm is created which swings the leg to folded-upward position. The leg and strut pivots are arranged so that the lever arm becomes longer during upward swinging of the leg to increase the mechanical advantage of this system. One form of the invention is shown in the accompanying drawings.

FIG. 5 is a fragmentary generally side elevational view illustrating the gear in trailer-supporting position.

FIG. 6 is a front generally elevational view of the landing gear in trailer-supporting position.

FIG. 7 is an enlarged fragmentary prospective view illustrating a releasable locking device.

FIG. 8 is an enlarged generally sectional view on line 8—8 of FIG. 5.

FIG. 9 is an enlarged sectional view on line 9—9 of FIG. 3 showing the leg folded upwardly and illustrating an intermediate position in broken lines.

FIG. 10 is a fragmentary generally elevational view of a lower end of the leg with the leg-swinging strut in an inactive position.

FIG. 11 is a fragmentary sectional view on line 11—11 of FIG. 9.

FIG. 12 is a sectional view on line 12—12 of FIG. 8.

Figure 1:
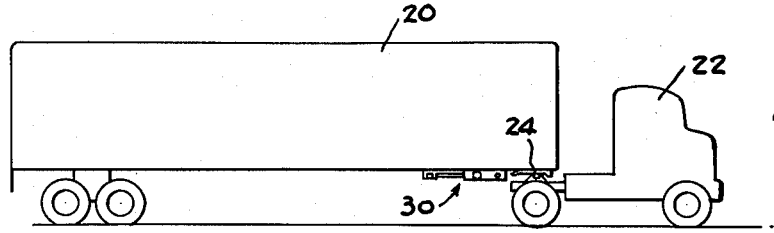
FIG. 1 is a diagrammatic side elevational view of a tractor and semi-trailer utilizing a landing gear according to this invention.

Shown in the drawings is a semi-trailer 20 coupled to a tractor 22 through a conventional fifth wheel 24, the upper portion of which is a plate 26 beneath the forward end of the trailer from which a king-pin 28 depends (FIGS. 5 and 6). Trailer 20 is provided with a landing gear 30 to the rear of fifth wheel plate 26 for supporting the forward end of the semi-trailer when it is uncoupled from tractor 22.

Figure 2:
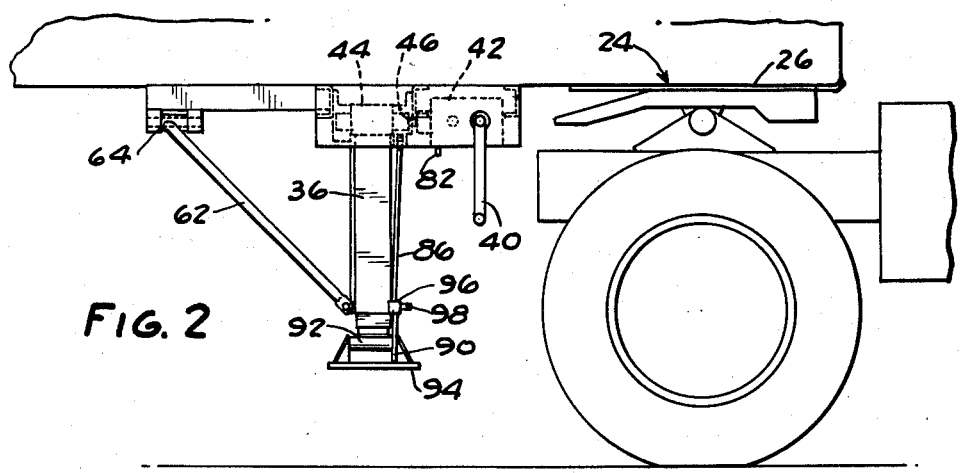
FIG. 2 is an enlarged fragmentary generally side elevational view illustrating the landing gear in an intermediate position.

The landing gear has two legs 32 and 34 which may be of identical construction except for a right- and left-hand relation. Each leg comprises an upper, outer leg tube 36 and a lower, inner leg tube 38 which are telescoped between a relatively extended position for bearing the load of trailer 20 and a relatively shortened condition (FIG. 2) by conventional means such as a jackscrew and nut mechanism (not shown) contained within the leg sections. The jackscrew is operated by conventional means such as a hand crank 40 or the equivalent through gearing contained in a gear box 42, gearing contained in head 44 of the leg, and interposed shafting 46. The gearing in legs 32 and 34 is operably interconnected by a shaft 48 (FIG. 6).

Head portion 44 of each leg is pivotally mounted on trailer 20 through such means as a trunnion 50 journaled on supports 52, 54 through sleeve bearings 56, the supports being illustrated as anchored to frame members 58 and 60 of the trailer. Each leg is shown as having a back brace 62 pivotally connected to the trailer frame as at 64 coaxially with pivot 50.

Each leg also is provided with a side brace 66 having the form of two brace elements 68 connected at their distal ends to a cross member 70. When the leg swings upwardly and downwardly, the end portions 72 of cross member 70 slide and rock within supporting channels 74. In the downward position of the leg (FIG. 8) a pivoted lock element 76 swings behind cross member 70 under the action of a spring 78 (FIG. 6) so that an abutment 80 on the lock element obstructs return movement of cross member 70 and secures the leg in downward position. To release lock 76, a handle 82 is pushed to the left as FIG. 8 is viewed to rock the latch about pivot 84 to disengage abutment 80 from cross member 70. Cross member 70 is then free to slide away from the leg mount to facilitate swinging of the leg upwardly.

A strut 86 is pivotally mounted adjacent to but independently of each swinging leg 32, 34; and for this purpose, each strut may conveniently be secured to head 44 through a pivot 88. The strut spans the length of upper leg tube 36 and has a lower end portion 90 which is engageable with a projection 92 on lower leg tube 38 at an intermediate position of retraction of tube 38 within tube 36. Conveniently, projection 92 may comprise a trunnion upon which a ground-engaging foot 94 is rockably mounted at the lower end of leg tube 38. The axes of strut pivot 88 and leg pivot 50 are substantially parallel so that the strut can swing with the leg between its downward and folded-upward positions.

Strut 86 projects through a guide bracket 96 secured on upper leg tube 36, and this guide bracket is divided into two sections by a pin 98 which can be pulled outwardly to enable the lower end 90 of the strut to be swung selectively to a position for engaging abutment 92 as shown in solid lines in FIG. 8 or another position where it will be free of abutment 92 as shown in dotted lines. The pin is biased inwardly by a suitable spring structure (not shown) to retain strut 86 in the selected position.

Pivot 88 and abutment 92 are positioned so that strut 86 extends at an angle to the direction of relative telescoping movement of leg tubes 36 and 38. This arrangement creates a lever arm which, when strut 86 and abutment 92 are interengaged, causes the leg to swing upwardly when leg tube 38 is further retracted. In addition, pivots 50 and 88 are so disposed relative to each other that the length of the lever arm increases as the leg swings upwardly.

Figure 4:
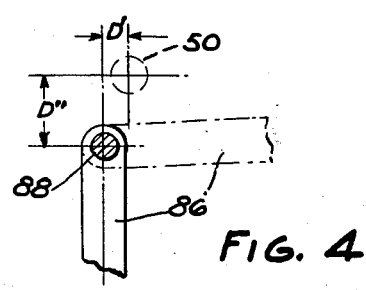
FIG. 4 is a diagrammatic representation of the variation of a lever arm which swings the gear to its upward folded condition.

A convenient arrangement is for abutment 92 and leg pivot 50 to be disposed substantially in the plane of the leg axis while the axis of pivot 88 is displaced a relatively short distance D' to one side of this plane (FIG. 4) and a somewhat greater distance D" below pivot 50.

Figure 3:
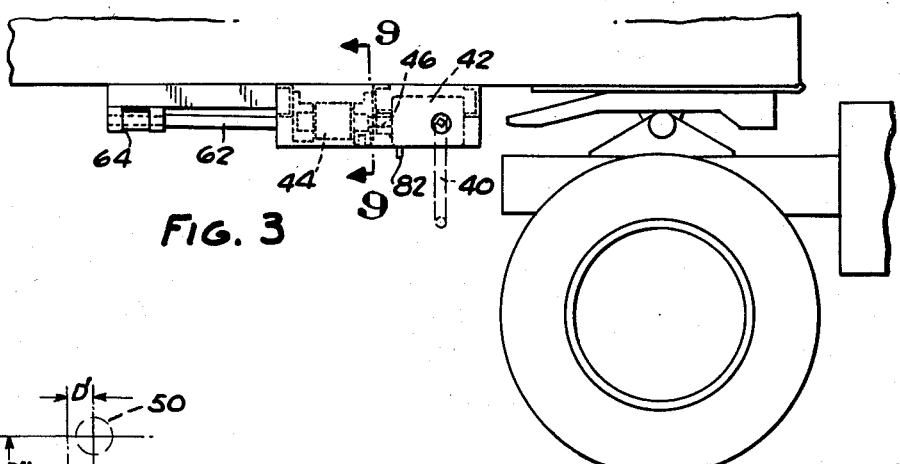
FIG. 3 is a view similar to FIG. 2 showing the gear folded upwardly.

In use, it may be assumed that the leg is initially in the downward, load-bearing position of FIGS. 5, 6, 8, and 12. After a tractor has backed under fifth wheel plate 26 and coupled to king-pin 28, handle 82 is rocked clockwise as FIG. 8 is viewed to release lock 76 to permit yoke 70 to slide to the right in channels 74. Handle 40 is then operated to retract leg tube 38 upwardly. Assuming that the landing gear is to be folded upwardly for road use as in FIGS. 1 and 3, strut 86 will be swung to the right as FIG. 8 is viewed so that its lower end 90 will be engaged by abutment 92 when leg tube 38 is partially retracted into upper leg tube 36 (dotted lines, FIG. 9).

Then, upon continued shortening of the leg, abutment 92 will push on angled strut 86 whose anchor pivot 88 resists longitudinal movement of the strut. The resultant forces include a lever arm which exerts force to the right as FIGS. 8 and 9 are viewed on abutment 92 and swings the leg counter-clockwise upwardly to the FIG. 9 position. In the initial range of movement little force is required for this purpose because the leg is projecting nearly straight downwardly and little weight is being lifted.

As the leg swings upwardly, progressively more and more weight is lifted. The length of the lever arm acting on trunnion 92 increases from D' to D", thereby progressively increasing the mechanical advantage of the system commensurately with the weight of the leg which is being lifted. In actual use, a satisfactory length for D' has been found to be about ½" and a satisfactory length for D" about 2". Strut 86 secures the leg in the upward folded position of FIG. 9 during road use without the necessity of any additional support or locking mechanism.

I claim:

1. In a landing gear for semi-trailer vehicles and the like having a leg with a piovtal mount for swinging between a downward load-bearing position and a folded-upward position, the leg having upper and lower leg sections which telescope relatively to shortened and extended condition and means operable to telescope said leg sections, said landing gear having a leg-swinging strut which extends at an angle to the direction of telescoping movement of said leg sections and in partially shortened condition of said leg has a pivotal connection with an anchor adjacent said leg and a connection with said lower leg section, improved structure wherein said pivotal connection has an axis which is displaced both horizontally from and below the axis of said pivotal mount for said leg, the vertical distance between said axes being greater than the horizontal distance therebetween, thereby creating a variable lever arm, the magnitude of which is generally in direct proportion to the angular distance of said leg from said downward position thereof, so that, as the force necessary to swing said leg upwardly increases, the upward force exerted on said leg also increases.

2. The improved structure defined in claim 1 wherein the connection of said strut with said lower leg section is detachable, said strut being swingable about said pivotal connection with said anchor selectively between one angular position in which said detachable connection is attachable and another angular position wherein said strut is inactivated, said leg sections, responsive to inactivation of said strut, being freed to telescope to substantially fully shortened condition while said leg is in said downward position thereof.

3. The improved structure defined in claim 2 and including in addition means selectively operable to secure said strut in said angular positions thereof.

4. The improved structure defined in claim 3 wherein said selectively operable means is mounted on said upper leg section.

5. In a landing gear for semi-trailer vehicles and the like having a leg with a pivotal mount for swinging between a downward load-bearing position and a folded-upward position, the leg having upper and lower leg sections which telescope relatively to shortened and extended condition and means operable to telescope said leg sections, said landing gear having a leg-swinging strut which extends at an angle to the direction of telescoping movement of said leg sections and in partially shortened condition of said leg has a pivotal connection with an anchor adjacent said leg and a connection with said lower leg section, improved structure wherein said pivotal connection has an axis which is displaced both horizontally from and below the axis of said pivotal mount for said leg, the vertical distance between said axes being greater than the horizontal distance therebetween, thereby creating a variable lever arm, the magnitude of which is generally in direct proportion to the angular distance of said leg from said downward position thereof, the connection of said strut with said lower leg section being detachable and comprising an abutment on said lower leg section and a cooperating abutment on said strut, said strut being swingable about said pivotal connection with said anchor selectively between one angular position and another angular position, said abutments in said one angular position of said strut being aligned longitudinally of said leg for inter-engagement in said partially shortened condition of said leg, said abutments in said other angular position of said strut being disaligned to remain disengaged in said partially shortened condition of said leg so that said leg sections in said other angular position of said strut are free to telescope to substantially fully shortened condition while said leg is in said downward position thereof.

6. The improved structure defined in claim 1 and including in addition means selectively operable to inactivate said strut, said leg, responsive to inactivation of said strut, being freed to telescope from said partially shortened condition thereof to substantially fully shortened condition while said leg is in said downward position thereof.

References Cited by the Examiner

UNITED STATES PATENTS

| | | | |
|---|---|---|---|
| 1,895,170 | 1/33 | Nabors | 280—150.5 |
| 1,988,304 | 1/35 | Duman | 254—86 |
| 2,734,726 | 2/56 | Gebhart | 254—86 |
| 2,837,312 | 6/58 | Troche. | |
| 3,004,772 | 10/61 | Bohlen et al. | 280—150.5 |

WILLIAM FELDMAN, *Primary Examiner.*